June 24, 1924.
C. D. SCHMIDT
AIR COOLED BRAKE OR CLUTCH
Filed May 16, 1922
1,498,983
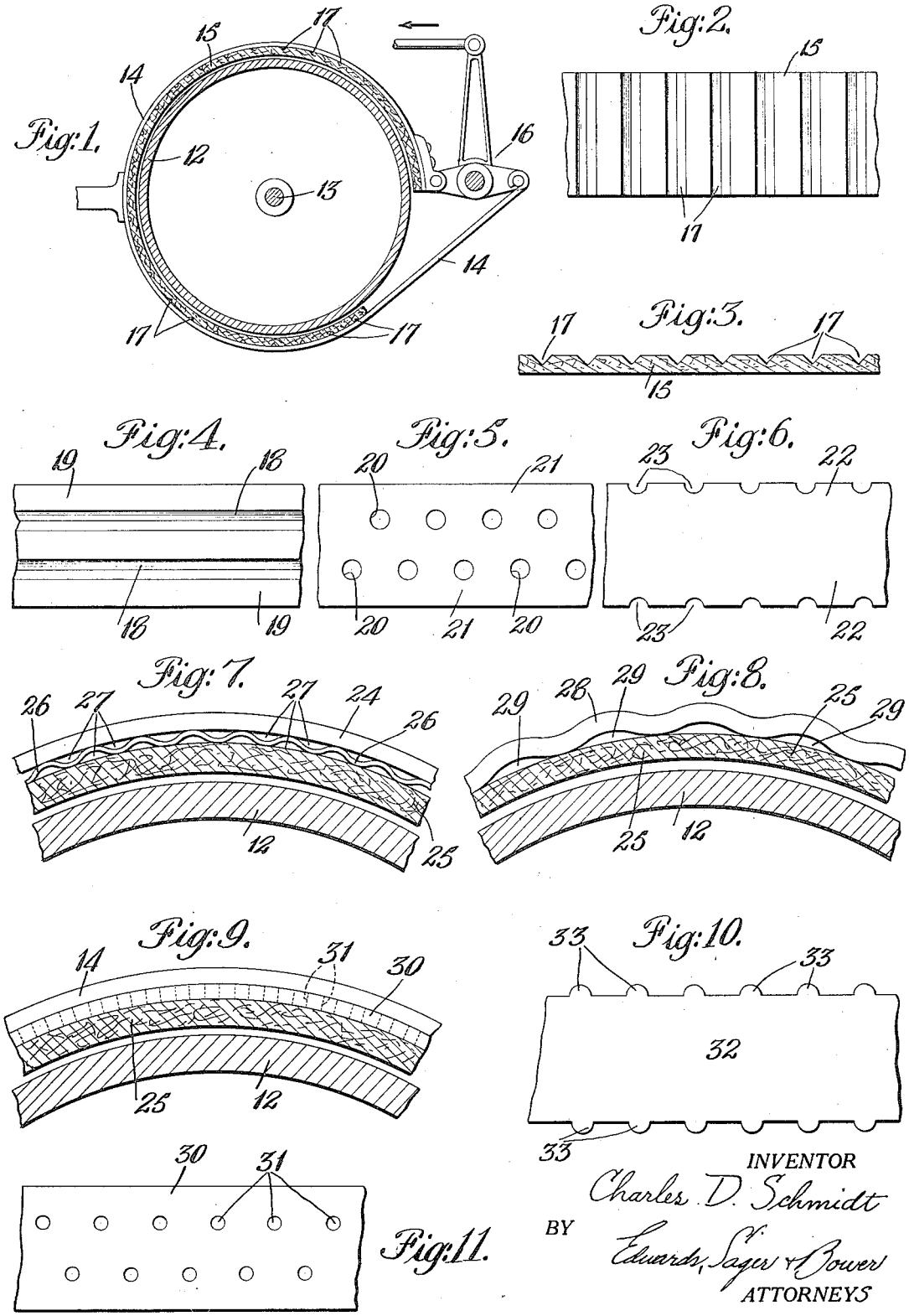

Patented June 24, 1924.

1,498,983

UNITED STATES PATENT OFFICE.

CHARLES D. SCHMIDT, OF JAMAICA, NEW YORK.

AIR-COOLED BRAKE OR CLUTCH.

Application filed May 16, 1922. Serial No. 561,350.

*To all whom it may concern:*

Be it known that I, CHARLES D. SCHMIDT, a citizen of the United States, residing at Jamaica, in the county of Queens and State of New York, have invented certain new and useful Improvements in Air-Cooled Brakes or Clutches, of which the following is a specification.

This invention relates to brakes or clutches of automotive vehicles and the like and particularly to the cooling of the brake or clutch to protect it from overheating and burning. The usual brake or clutch is provided with a replaceable lining of woven material such as asbestos or cotton or a mixture with which is intermingled metal strands, the whole being impregnated with a rubberized compound; or sometimes a fibre material is used. These flat bands or brake lining are fastened to the brake bands or the brake drum shoes by means of rivets or the like and the heat generated during the braking action is more or less confined to the body of the brake lining and directly transmitted to the shoe or band.

The main object of this invention is to provide a brake or clutch in which the lining is air cooled.

In the accompanying drawings illustrating the invention—

Fig. 1 is a diagrammatic sectional view of a brake having an outer band provided with an air cooled lining.

Fig. 2 is a plan view of the air cooled surface of the lining shown in Fig. 1.

Fig. 3 is a sectional view of the lining shown in Fig. 1.

Figs. 4, 5 and 6 are views similar to Fig. 2 but illustrating modifications.

Figs. 7, 8, 9 and 10 are sectional views illustrating modified mountings of the brake lining, and Fig. 11 is a plan view of a portion of a lining member shown in Fig. 9.

In the specific embodiment of the invention illustrated in Fig. 1 a brake drum 12 rotating on the shaft 13 is provided with an outer flexible band 14 carrying a brake lining 15 which is drawn against the periphery of the drum by the operating mechanism 16 as shown. The outer surface of the lining 15 in contact with the band 14 is provided with a series of grooves or corrugations 17 which increase the radiating surface and provide for circulation of air between the band and the lining so as to dissipate the heat generated in the lining. The lining of this invention may of course also be used with an internal expanding brake or with a clutch.

In the modification shown in Fig. 4 the grooves or creases 18 of the lining 19 are carried lengthwise of the band instead of crosswise as in Figs. 1 and 3. In Fig. 5 a series of staggered holes 20 are punched in the lining 21 and in Fig. 6 the edges of the lining 22 are clipped out as indicated at 23 so as to act as little fins and give a greater area for the radiation of heat.

In the modification shown in Fig. 7 the brake band 24 has interposed between it and the lining 25 a corrugated strip of metal 26 so that all the channels or spaces 27 will serve for air circulation for cooling the brake band and the lining.

In Fig. 8 the band 28 is itself corrugated so as to leave spaces 29 between the band and the lining 25.

In the modification shown in Figs. 9 and 11 a strip 30 of flat or corrugated metal having perforations 31 is introduced between the band 14 and the lining 25. In Fig. 10 the lining 32 is provided with outwardly extending projections 33 increasing the radiating area and acting as a fan to cool the lining.

In all of these modifications the radiating surface of the lining in contact with the air is increased in area so that the circulation of the air will provide an additional cooling effect tending to maintain a lower temperature of the lining and avoid overheating and burning. The form of the air spaces may be any design that will effect less contact of its surface with the part to which it is fixed, while the other or braking side preferably has a flat surface and full bearing area. All of these designs provide circulating air spaces between the brake lining and the part to which it is fixed so as to introduce air cooling means and the lining itself is of variable thickness due to the formation of the grooves or air spaces in it. The formation of the lining so as to contact only at intervals, that is at separated areas, with the supporting band also permits the lining to adapt itself more readily to the formation of the drum so as to give a more homogeneously distributed braking effect. While the invention has been described in connection with specific modifications it is not confined thereto but is intended to cover such variations as fall within the scope of the appended claims.

I claim:—

1. A lining for brakes and clutches formed with air circulating spaces extending crosswise of the lining surface opposite the braking surface of the lining.

2. A lining for brakes and clutches formed with air circulating spaces extending crosswise of the back surface of the lining opposite the braking surface of the lining and supporting means contacting with said back surface at separated areas.

3. A lining for brakes and clutches formed with air circulating spaces extending crosswise of the back surface of the lining opposite the braking surface of the lining, said lining being adapted to contact with a supporting back surface at separated areas.

4. A brake lining having one surface flat for the brake surface and the other surface irregular for the passage of air.

5. A brake lining having an irregular surface to reduce contact with the supporting member and form air passages or spaces.

6. A lining for brakes and clutches having a variable thickness so that one of its surfaces is irregular and adapted to contact with a supporting member at separated areas.

7. A lining for brakes and clutches having a flat surface and a variable thickness so that the opposite surface is irregular and adapted to contact with a supporting member at separated areas.

8. A lining for brakes and clutches having one of its surfaces provided with transverse grooves extending crosswise of the lining so that said lining is composed of a series of portions of different thickness.

CHARLES D. SCHMIDT.